(12) United States Patent
Zhang et al.

(10) Patent No.: US 11,056,896 B2
(45) Date of Patent: Jul. 6, 2021

(54) TERMINAL AND DEVICE

(71) Applicant: Guangdong Oppo Mobile Telecommunications Corp., Ltd., Guangdong (CN)

(72) Inventors: Jialiang Zhang, Guangdong (CN); Shiming Wan, Guangdong (CN); Jiada Li, Guangdong (CN); Jun Zhang, Guangdong (CN); Chen Tian, Guangdong (CN); Shebiao Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 397 days.

(21) Appl. No.: 15/691,961

(22) Filed: Aug. 31, 2017

(65) Prior Publication Data

US 2018/0102658 A1    Apr. 12, 2018

(30) Foreign Application Priority Data

Oct. 12, 2016  (WO) ................ PCT/CN2016/101943
Oct. 12, 2016  (WO) ................ PCT/CN2016/101944

(51) Int. Cl.
*H02J 7/00* (2006.01)

(52) U.S. Cl.
CPC .............. *H02J 7/0044* (2013.01); *H02J 7/00* (2013.01); *H02J 7/0013* (2013.01);
(Continued)

(58) Field of Classification Search
CPC ...... H02J 7/0044; H02J 7/0013; H02J 7/0065; H02J 7/0063; H02J 7/0055; H02J 7/0052; H02J 7/0047; H02J 2007/0062; H02J 2007/0049; H02J 7/0068; H02J 7/022; H02J 7/0073; H02J 7/0031; H02J 1/10;
(Continued)

(56) References Cited

U.S. PATENT DOCUMENTS 5,254,931 A * 10/1993 Martensson ............ H02J 7/008
                                                                320/114
6,326,767 B1 * 12/2001 Small .................. H01M 2/1055
                                                                320/116
(Continued)

FOREIGN PATENT DOCUMENTS

CN       1163500 A      10/1997
CN     101409455 A       4/2009
(Continued)

OTHER PUBLICATIONS

The Second Written Opinion issued in corresponding Singapore application No. 11201801125Y dated Feb. 22, 2019.
(Continued)

*Primary Examiner* — Nathaniel R Pelton
*Assistant Examiner* — Mohammed J Sharief (57) ABSTRACT

A terminal and a device are provided. The terminal includes a charging interface and a first charging circuit. The first charging circuit is coupled with the charging interface, and is configured to receive an output voltage from the adapter via the charging interface and apply the output voltage to both ends of multiple cells connected in series in the terminal to charge the multiple cells.

16 Claims, 6 Drawing Sheets

(52) U.S. Cl.
CPC .......... *H02J 7/0047* (2013.01); *H02J 7/0063* (2013.01); *H02J 7/0049* (2020.01); *H02J 2207/20* (2020.01); *H02J 2207/40* (2020.01)

(58) Field of Classification Search
CPC .... H02J 7/1423; H02J 2207/40; H02J 7/0091; H02J 7/14; Y02E 60/12; H01M 10/44; H01M 10/443; Y02B 40/90
USPC .......................... 320/137, 134, 136, 152, 162
See application file for complete search history.

(56) References Cited

U.S. PATENT DOCUMENTS

| | | | | |
|---|---|---|---|---|
| 10,291,050 | B2* | 5/2019 | Zhang | H02J 7/0072 |
| 2005/0286275 | A1* | 12/2005 | Ryu | H02J 1/08 |
| | | | | 363/45 |
| 2007/0139012 | A1 | 6/2007 | Hayashigawa | |
| 2008/0074077 | A1 | 3/2008 | Wong et al. | |
| 2008/0084189 | A1* | 4/2008 | Kim | G06F 1/263 |
| | | | | 320/160 |
| 2009/0027013 | A1 | 1/2009 | Odaohhara | |
| 2009/0256529 | A1* | 10/2009 | Wang | H02J 7/0031 |
| | | | | 320/163 |
| 2011/0050945 | A1* | 3/2011 | Konno | H04N 5/3698 |
| | | | | 348/222.1 |
| 2011/0193525 | A1 | 8/2011 | Ro | |
| 2012/0019190 | A1* | 1/2012 | Jones | H01M 10/46 |
| | | | | 320/101 |
| 2012/0112705 | A1* | 5/2012 | Wang | H02J 7/00 |
| | | | | 320/152 |
| 2012/0119694 | A1 | 5/2012 | Carpenter et al. | |
| 2014/0009106 | A1* | 1/2014 | Andrea | H02J 7/0018 |
| | | | | 320/107 |
| 2014/0084868 | A1 | 3/2014 | Yun et al. | |
| 2014/0292278 | A1* | 10/2014 | Wu | H02J 7/00 |
| | | | | 320/112 |
| 2015/0145468 | A1 | 5/2015 | Ma et al. | |
| 2015/0198932 | A1* | 7/2015 | Cha | H02M 3/156 |
| | | | | 700/295 |
| 2015/0318721 | A1* | 11/2015 | Watanabe | H02J 7/0016 |
| | | | | 320/118 |
| 2016/0064962 | A1 | 3/2016 | Huang et al. | |
| 2016/0064979 | A1 | 3/2016 | Huang et al. | |
| 2016/0105038 | A1 | 4/2016 | Chi | |
| 2016/0239040 | A1* | 8/2016 | Ripley | H04B 1/40 |
| 2017/0244264 | A1* | 8/2017 | Zhang | H02J 7/007 |

FOREIGN PATENT DOCUMENTS

| | | | |
|---|---|---|---|
| CN | 102723752 A | 10/2012 | |
| CN | 103094939 A | 5/2013 | |
| CN | 103580098 A | 2/2014 | |
| CN | 103762702 A | 4/2014 | |
| CN | 104022542 A | 9/2014 | |
| CN | 203813491 U | 9/2014 | |
| CN | 104810875 A | 7/2015 | |
| CN | 104810877 A | 7/2015 | |
| CN | 204481505 U | 7/2015 | |
| CN | 204668976 U | 9/2015 | |
| CN | 104967201 A | 10/2015 | |
| CN | 104993565 A | 10/2015 | |
| CN | 105098900 A | 11/2015 | |
| CN | 105162206 A | 12/2015 | |
| CN | 105471001 A | 4/2016 | |
| CN | 205141721 U | 4/2016 | |
| CN | 105720645 A | 6/2016 | |
| CN | 105762862 A | 7/2016 | |
| CN | 105762883 A | 7/2016 | |
| CN | 105896670 A | 8/2016 | |
| CN | 205544410 U | 8/2016 | |
| CN | 105932725 A | 9/2016 | |
| CN | 105978049 A | 9/2016 | |
| CN | 105978069 A | 9/2016 | |
| CN | 106230082 A | 12/2016 | |
| CN | 106532820 A | 3/2017 | |
| CN | 106786980 A | 5/2017 | |
| EP | 1066658 A1 * | 1/2001 | ............ H01M 10/48 |
| EP | 2879266 A1 | 6/2015 | |
| EP | 2887492 A2 | 6/2015 | |
| EP | 3131170 A1 | 2/2017 | |
| EP | 3211749 A1 | 8/2017 | |
| EP | 3334005 A1 | 6/2018 | |
| JP | H6-24357 U | 3/1994 | |
| JP | 07-143052 A | 6/1995 | |
| JP | 07-143683 A | 6/1995 | |
| JP | H9-121462 A | 5/1997 | |
| JP | H10136573 A | 5/1998 | |
| JP | 10-256983 A | 9/1998 | |
| JP | 2000333377 A | 11/2000 | |
| JP | 3091070 U | 1/2003 | |
| JP | 2005-086933 A | 3/2005 | |
| JP | 2006-302567 A | 11/2006 | |
| JP | 2006-353010 A | 12/2006 | |
| JP | 2007-215249 A | 8/2007 | |
| JP | 2007336664 A | 12/2007 | |
| JP | 2008-099370 A | 4/2008 | |
| JP | 2010124682 A | 6/2010 | |
| JP | 2011-004509 A | 1/2011 | |
| JP | 2011-67021 A | 3/2011 | |
| JP | 2011139622 A | 7/2011 | |
| JP | 2012-249410 A | 12/2012 | |
| JP | 2013183523 A | 9/2013 | |
| JP | 2014-003896 A | 1/2014 | |
| JP | 2014-87200 A | 5/2014 | |
| JP | 2015-002068 A | 1/2015 | |
| JP | 2015-100236 A | 5/2015 | |
| JP | 2016-509463 A | 3/2016 | |
| JP | 2016-73066 A | 5/2016 | |
| TW | I479774 B | 4/2015 | |
| TW | 201535928 A | 9/2015 | |
| TW | 201539935 A | 10/2015 | |
| WO | 2015185452 A1 | 12/2015 | |
| WO | 2016074158 A1 | 5/2016 | |
| WO | 2016074391 A1 | 5/2016 | |
| WO | 2016074458 A1 | 5/2016 | |
| WO | 2016098631 A1 | 6/2016 | |
| WO | 2016149999 A1 | 9/2016 | |

OTHER PUBLICATIONS

Office Action 1 issued in corresponding European application No. 17189332.4 dated Feb. 25, 2019.
Extended European Search Report issued in corresponding European application No. 17189332.4 dated Mar. 7, 2018.
Notice of acceptance issued in corresponding AU application No. 2017297856 dated Aug. 8, 2019.
Examination Report issued in corresponding in application No. 201734034964 dated Apr. 12, 2019.
Examination Report issued in corresponding in application No. 201734034964 dated Dec. 4, 2019.
EPO Summons to attend oral proceedings issued in corresponding EP application No. 17189332.4 dated Jan. 28, 2020.
English translation of the Decision of Grant issued in corresponding JP application No. 2019-002131 dated May 12, 2020.
English translation of the fifth OA issued in corresponding CN application No. 201710773687.6 dated May 21, 2020.
Japan Evaluation Report with English Translation for JP Application ZL201690001726X dated Oct. 11, 2019.
Japan Decision of Refusal with English Translation for JP Application 2018-514886 dated Feb. 28, 2019.
Japan Decision of Refusal with English Translation for JP Application 2018-507539 dated Mar. 27, 2019.
Japan Decision of Refusal with English Translation for JP Application 2017-189123 dated Sep. 4, 2018.
China First Office Action with English Translation for CN Application 201710773687.6 dated Mar. 25, 2019.
Communication pursuant to Article 94(3) EPC Exam for EP Application 17189332.4 dated Aug. 23, 2019.

(56) References Cited

OTHER PUBLICATIONS

Korea Notice of Final Rejection with English Translation for KR Application 10-2018-7004656 dated Dec. 23, 2020.
Japan Notice of Reason for Refusal with English Translation for JP Application 2018507539 dated Nov. 2, 2020.
China Second Office Action with English Translation for CN Application 2017170773687.6 dated May 29, 2019.
Taiwan Notice of Review with English Translation for TW Application 10720072150 dated Jan. 23, 2021.
International Search Report with English Translation for PCT/CN2016/101943 dated Jul. 24, 2017.
Japan Decision of Refusal with English Translation for JP Application 2019-002131 dated Feb. 17, 2020.
China Fourth Office Action with English Translation for CN Application 201710773687.6 dated Oct. 8, 2019.
Korea Reason for Refusal with English Translation of KR Application 10-2017-0126970 dated Dec. 18, 2019.
Japan Decision to Grant with English Translation for JP Application 2018-514886 dated Sep. 13, 2019.
China Third Office Action with English Translation for CN Application 201710773687.6 dated Aug. 6, 2019.
International Search Report with English Translation for PCT/CN2016/101944 dated Jul. 18, 2017.

* cited by examiner

FIG. 11

TERMINAL AND DEVICE

CROSS-REFERENCE TO RELATED APPLICATION(S)

This application claims priority to International Application No. PCT/CN2016/101943, filed on Oct. 12, 2016, and International Application No. PCT/CN2016/101944, filed on Oct. 12, 2016, the contents of both of which are herein incorporated by reference in their entities.

TECHNICAL FIELD

The present disclosure relates to the field of electronic equipment, and particularly to a terminal and a device.

BACKGROUND

Terminals, specifically terminals such as smart phones are becoming increasingly popular with consumers; however, mobile terminals generally consume a lot of power and so need to be frequently charged.

In order to improve the charging speed, a feasible solution which uses a large current for charging of the mobile terminal has been proposed. The greater the charging current, the faster the charging speed of the mobile terminal, but the mobile terminal heat problems will be more serious.

Therefore, how to ensure the charging speed under the premise of reducing the terminal heat has become an urgent problem to be solved.

BRIEF DESCRIPTION OF THE DRAWINGS

To better illustrate the implementations of the disclosure, a brief description of the accompanying drawings for use with the illustration of the implementations is provided below. It is evident that the drawings described below depict merely some implementations and those of ordinary skill in the art can obtain other drawings based on the arrangements illustrated in these drawings without making inventive efforts.

DETAILED DESCRIPTION

Terminal

The term "terminal" as used in the implementations of the present disclosure may be, but is not limited to, a device configured to be coupled via a wired line and/or receive/transmit communication signals via a wireless interface. Examples of the wired line may include, but are not limited to, at least one of a public switched telephone network (PSTN), a digital subscriber line (DSL), a digital cable, a cable used for direct connection, and/or another data connection line or network connection line. Examples of the wireless interface may include, but are not limited to, a wireless interface for a cellular network, a wireless local area network (WLAN), a digital television network such as a digital video broadcasting-handheld (DVB-H) network, a satellite network, an AM-FM broadcast transmitter, and/or another communication terminal.

A terminal configured to communicate via a wireless interface may be referred to as a "wireless communication terminal", a "wireless terminal", and/or a "mobile terminal". Examples of a mobile terminal may include, but are not limited to, a satellite or cellular telephone, a personal communication system (PCS) terminal capable of combining cellular radio telephone and data processing, fax, and data communication capabilities, a personal digital assistant (PDA) equipped with radio telephone capacity, pager, Internet/Intranet access capacity, Web browser, notebook, calendar, and/or global positioning system (GPS) receiver, and a conventional laptop and/or a handheld receiver or another electronic device equipped with radio telephone capacity.

The term "terminal" as used in the implementations of the present disclosure may include a power bank; the power bank can accept the charging from an adapter, so as to store energy and provide energy for other electronic devices.

Technical solutions of implementations of the present disclosure will be described below with reference to the accompanying drawings.

In the related art, a terminal such as a mobile terminal generally has a single cell. When the single cell is charged with a large charging current, heat of the mobile terminal can be serious. In order to guarantee the charging speed of the terminal and alleviate the heat in the charging process thereof, a battery structure inside the terminal is modified, in which multiple cells (that is, a plurality of cells) connected in series and can be directly charged are introduced. Technical solutions of implementations will be described in detail with reference to FIG. 1.

Figure 1:
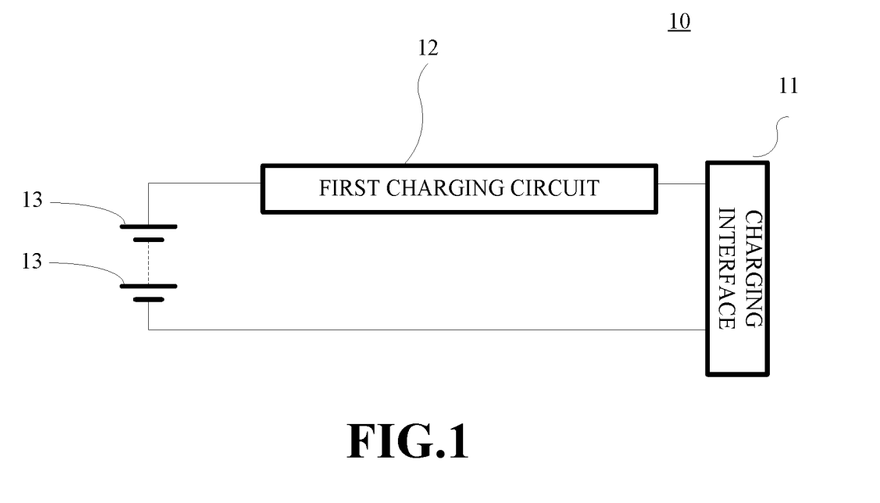
FIG. 1 is a structural diagram illustrating a terminal according to an implementation of the present disclosure.

FIG. 1 is a structural diagram illustrating a terminal according to an implementation of the present disclosure. As illustrated in FIG. 1, a terminal 10 may include a charging interface 11 and a first charging circuit 12 coupled with the charging interface 11. The first charging circuit 12 can be configured to receive an output voltage from an adapter. The first charging circuit 12 can be further configured to apply the output voltage directly to both ends of multiple cells 13 which are connected in series in the terminal, so as to charge the plurality cells 13 directly. In FIG. 1, two single cells connected in series are illustrated and the present disclosure is not limited thereto, however, for example, three or even more cells can be arranged in the circuit.

The term "directly" used herein either individually or sometimes go with the terms "apply", "output current", and/or "output voltage", may mean that the output voltage and the output current from the power adapter matches current voltage of the multiple cells, or may mean that, the output voltage from the adapter can be applied to both ends of the multiple cells for charging without voltage converting.

In the related art, the output voltage of the adapter is not directly applied to both ends of a cell, instead, it converts the output voltage of the adapter through a number of conversion circuits and then apply the converted voltage to both ends of the cell for charging. For example, the output voltage of the adapter is about 5V generally. After receiving the 5V output voltage of the adapter, the terminal will use a Buck circuit to perform a step-down conversion, alternatively, the terminal may use a Boost circuit to perform a step-up conversion; thereafter, the terminal can apply the converted voltage to both ends of the cell.

Usage of the conversion circuit may cause the heat of the terminal to be serious and cause a power loss of the adapter either. In order to solve the heat problem caused by the conversion circuit and reduce the power loss, in implementations of the present disclosure, the multiple cells 13 are directly charged via the first charging circuit 12.

"Direct-charge" means the output voltage from the adapter is directly applied or introduced to both ends of the multiple cells 13 for charging, the output voltage of the adapter need not be converted by the conversion circuit and energy loss caused by a conversion process can be avoided. In the charging process through the first charging circuit 12, in order to adjust a charging voltage in the first charging circuit 12, the adapter can be designed as an intelligent adapter and the conversion circuit for the charging voltage can be built inside the adapter, as such, conversion of the charging voltage can be completed by the adapter. The burden of the terminal can be reduced and the implementation of the terminal can be simplified.

The direct-charge scheme can reduce the heat generated in the terminal to a certain degree; however, when the output current of the adapter is too large, such as between 5 A and 10 A, the heat of the terminal may still be serious and raise safety risks. In order to guarantee the charging speed and further relieve the heat of the terminal, according to implementations of the present disclosure, the battery structure inside the terminal is modified and multiple cells connected in series are provided. To achieve the same charging speed, compared with a single-cell scheme in the related art, the charging current required for the multiple cells is 1/N of the charging current required for a single cell (N represents the number of cells serially connected inside the terminal). In other words, compared with the single-cell scheme in the related art, the technical solution of the present disclosure can greatly reduce the magnitude of the charging current under the premise of ensuring the same charging speed, thereby reducing the heat generated in the terminal during a charging process.

For example, for a single cell of 3000 mAh, a charging current of 9 A will be required to achieve a charging rate of 3 C. Two cells of 1500 mAh can be connected in series to substitute the single cell of 3000 mAh to obtain the same charging speed and reduce the heat generated when charging the terminal. As such, a charging current of about 4.5 A can achieve a charging rate of 3 C, and compared with a charging current of 9 A, the heat caused by the charging current of 4.5 A is significantly lower.

Since the multiple cells 13 is charged directly via the first charging circuit 12, the output voltage received by the first charging circuit 12 from the adapter toned to be larger than the overall voltage of the multiple cells. The operating voltage of a single cell is about 3.0V~4.35V generally, based on this, for dual cells connected in series, the output voltage of the adapter can be set as greater than or equal to 10V.

The type of the charging interface 11 mentioned herein is not particularly limited. For example, it can be a universal serial bus (USB) interface or a TYPE-C interface. The USB interface can be a normal USB interface or a micro USB interface. The first charging circuit 12 may charge the multiple cells 13 via a power line in the USB interface. The power line in the USB interface can be a VBus line and/or ground line in the USB interface.

The type of the terminal mentioned herein is not particularly limited. For example, it can be a smart phone, a pad, and the like.

The multiple cells 13 in the implementations can be cells with the same or similar specification or parameter. Cells with the same or similar specification can facilitate management, meanwhile, the overall performance and service life of the multiple cells 13 composed of cells with the same or similar specification or parameter can be improved.

It will be appreciated that the multiple cells 13 connected in series with each other is capable of dividing the output voltage of the adapter.

Currently, the terminal (or devices/chips within the terminal) is powered via a single cell. According to implementations of the present disclosure, multiple cells connected in series are provided. The overall voltage of the multiple cells is higher and is therefore not suitable to power the terminal (or devices/chips within the terminal) directly. To solve this problem, a possible implementation is to adjust the operating voltage of the terminal (or devices/chips within the terminal) such that the terminal is capable of being powered via multiple cells. This implementation, however, changes the terminal a lot and costly. Implementations of the present disclosure, which aims to address the issue of how to power the terminal via the multiple cells, will be described below in detail.

Figure 2:
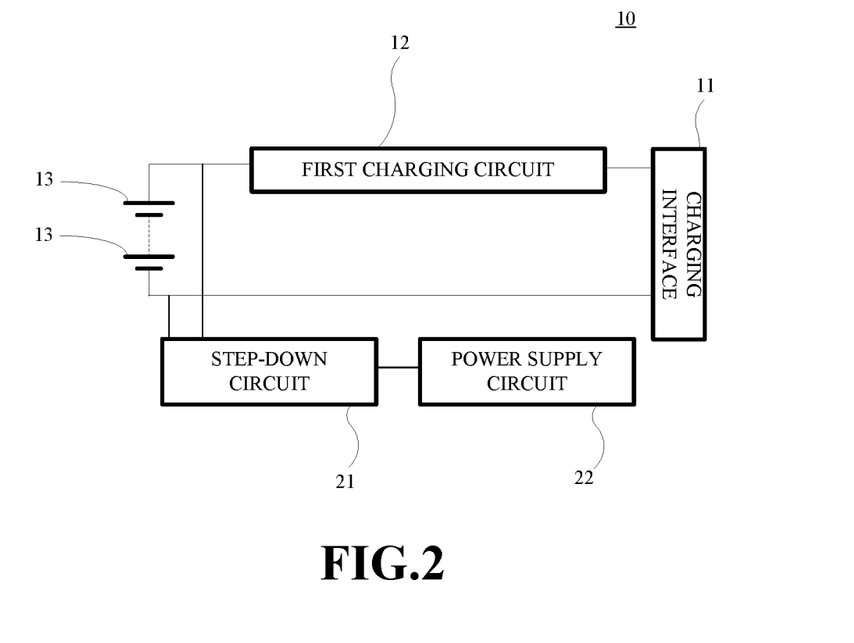
FIG. 2 is a structural diagram illustrating a terminal according to another implementation of the present disclosure.

As one implementation, as illustrated in FIG. 2, the terminal 10 may further include a step-down circuit 21 and a power supply circuit 22. The step-down circuit 21 has input ends (for example, at least one input ends, in one example, two input ends, which can be arranged integrally or separately) and an output end. The input ends of the step-down circuit 21 may be coupled with both ends of the multiple cells 13 and is configured to convert the overall voltage of the multiple cells 13 into a first voltage $V_1$, where $a \leq V_1 \leq b$, and a represents the minimum operating voltage of the terminal 10 (or devices/chips within the terminal 10), b represents the maximum operating voltage of the terminal 10 (or devices/chips within the terminal 10). The power supply circuit 22 is coupled to the output end of the step-down circuit 21 and is configured to power the terminal 10 based on the first voltage $V_1$.

On the basis of the implementation of FIG. 1, the step-down circuit 21 is provided in the implementation as illustrated in FIG. 2. When the terminal 10 is in an operating state, the overall voltage of the multiple cells 13 will be stepped down via the step-down circuit 21 to obtain the first voltage $V_1$, the amplitude of which is between the minimum operating voltage and the maximum operating voltage of the terminal 10 and therefore can be used to power the terminal directly, and consequently, the issue of how to power the terminal with the multiple cells can be addressed.

The overall voltage of the multiple cells 13 varies with the power of the multiple cells 13. Therefore, the overall voltage of the multiple cells 13 can be the current overall voltage of the multiple cells 13. For example, the operating voltage of a single cell can be between 3.0V~4.35V. Suppose the multiple cells 13 include two single cells and the current voltage of each of them is 3.5V, the overall voltage of the foregoing multiple cells 13 will be 7V.

For a single cell, the operating voltage thereof can be in the range of 3.0V-4.35V for example, and in this case, a=3.0V, b=4.35V. To guarantee a normal power supply voltage in the devices within the terminal, the step-down circuit 21 may reduce the overall voltage of the multiple cells 13 to any value in the range of 3.0V-4.35V. The step-down circuit 21 may be implemented in a variety of ways, for example, a Buck circuit, a charge pump, or the like.

In order to simplify the structure of the circuit, the step-down circuit 21 can be a charge pump, through which the overall voltage of the multiple cells 13 can be reduced to 1/N of the current overall voltage, where N represents the number of cells constituting the multiple cells 13. A traditional Buck circuit includes switches, inductors, and other devices and has a relatively large inductance loss, and stepping down with the Buck circuit will result in a relatively large power loss in the multiple cells 13. Compared with the Buck circuit, the charge pump mainly uses a switch(s) and a capacitor(s) for stepping down, in which the capacitor basically do not consume extra energy and therefore, circuit loss caused by a step-down process can be reduced in case the charge pump is used. The switch inside the charge pump controls the charging and discharging of the capacitor in a certain way, such that the input voltage can be reduced by a certain factor (1/N in some implementations) to obtain a desired voltage.

Figure 3:
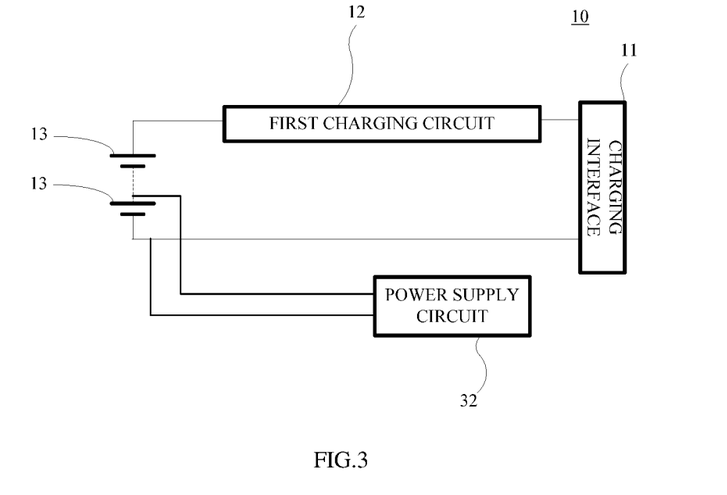
FIG. 3 is a structural diagram illustrating a terminal according to still another implementation of the present disclosure.

As another implementation, as illustrated in FIG. 3, the terminal 10 may include a power supply circuit 32. Compared with the structure illustrated in FIG. 2, the step-down circuit is removed from FIG. 3 and the power supply circuit 32 can be coupled with the multiple cells directly. In detail, the power supply circuit 32 may have input ends (such as two input ends) coupled with both ends of any single cell of the multiple cells 13 and can power devices inside the terminal 10 on the basis of the voltage of the single cell connected therewith.

It should be noted that voltage ripple may occur after the step-down process of the step-down circuit and may affect the power quality of the terminal. According to implementations of the present disclosure, the supply voltage is drawn directly from both ends of a certain single cell of the multiple cells to power devices inside the terminal. As the output voltage of the cell is relatively stable, it is possible to address the problem of how to supply power via the multiple cells while maintaining the power supply quality of the terminal.

Figure 4:
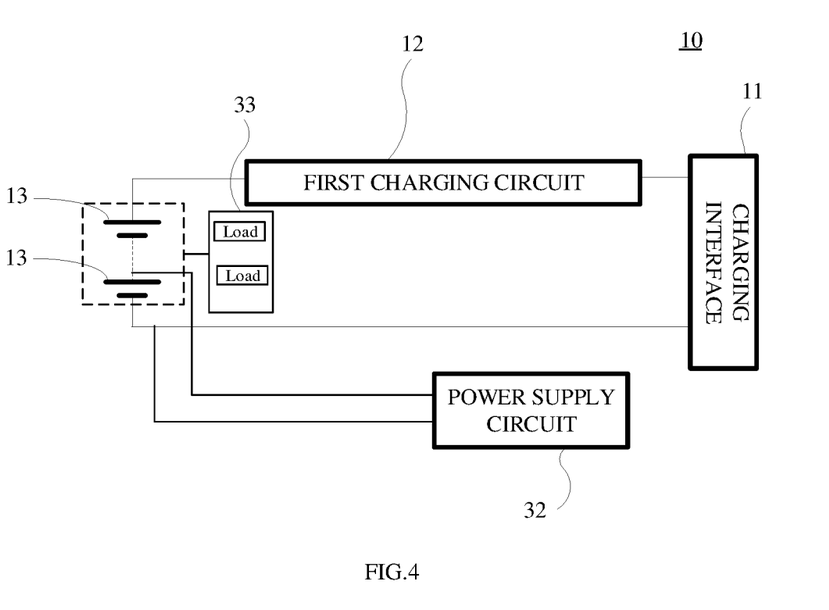
FIG. 4 is a structural diagram illustrating a terminal according to still another implementation of the present disclosure.

Further, on the basis of the implementation of FIG. 3, FIG. 4 further illustrates a terminal 10 which additionally includes an equalization circuit 33. The equalization circuit 33 is coupled with the multiple cells 13 and is configured to equalize the voltage among each cell of the multiple cells 13.

After using the power supply scheme as illustrated in FIG. 3, a cell (hereinafter referred to as "main cell" and the remaining cell(s) will be referred as "secondary cell") that powers devices within the terminal will continue to consume power, this may cause the voltage between the main cell and secondary cells to be unbalanced (i.e., voltage inconsistency). The voltage imbalance occurred in the multiple cells 13 may reduce the overall performance and service life of the multiple cells 13. Besides, the voltage imbalance occurred in the multiple cells 13 makes it difficult to manage the multiple cells 13 uniformly. Take the above into consideration, the equalization circuit 33 is used to equalize the voltage among each cell of the multiple cells 13, improve the overall performance of the multiple cells 13, and facilitate the uniform management of the multiple cells 13.

The equalization circuit 33 can be implemented in various ways. For example, a load can be connected at both ends of a secondary cell to consume the power of the later, as such, the power of the secondary cell can be consistent with the main cell, and the voltage of the secondary cell can be consistent with the main cell. Alternatively, the secondary cell can be used to charge the main cell until the voltage of these two becomes the same.

As the output power of the adapter becomes larger, it is likely to cause lithium precipitation when charging cells inside the terminal, reducing the life of the cell.

Figure 5:
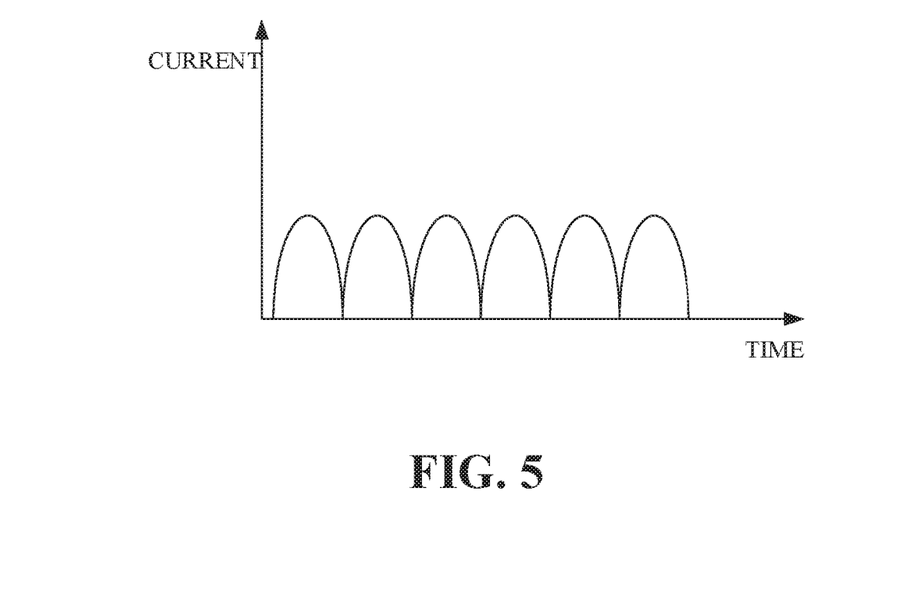
FIG. 5 is a waveform diagram of a pulsating direct current (DC) according to an implementation of the present disclosure.

As one implementation, the first charging circuit 12 may be further configured to receive an output current from the adapter. In order to improve the reliability and safety of the cell, in some implementations, it is possible to control the adapter to output a pulsating direct current (DC) (also known as unidirectional pulsating output current, current of a pulsating waveform, or current of a steamed-bun shaped waveform). Since the first charging circuit 12 can be used for direct charging, the pulsating DC output by the adapter can be used to charge the multiple cells 13 directly. As illustrated in FIG. 5, the current magnitude of the pulsating DC is periodically changed; compared with a constant-current, the pulsating DC is capable of relieving lithium precipitation of the cell and improving the service life thereof. Besides, compared with the constant-current, the pulsating DC can reduce the probability and strength of arcing of a contact(s) of the charging interface and prolong the service life of the charging interface.

There can be several ways to set the output current of the adapter as a pulsating DC. For example, a secondary filter circuit of the adapter can be removed, and an output current of a second rectifier circuit (the output current of the rectifier circuit is the pulsating DC) can be used as the output current of the adapter directly.

Similarly, in some implementations, the output voltage received by the first charging circuit 12 from the adapter can be a voltage of a pulsating waveform, which is also known as unidirectional pulsating output voltage or a voltage of a steamed-bun shaped waveform.

Alternatively, in some implementations, the output current received by the first charging circuit 12 from the adapter can also be an alternating current (AC) (for example, there is no need for rectification and filtering inside the adapter, and mains supply can be output directly after being stepped down). The AC is also capable of relieving lithium precipitation and improving the service life of the cell.

Alternatively, in some implementations, the first charging circuit 12 is operable in a charging mode of constant-current mode. It should be noted that, the constant-current mode means that the charging current remains constant over a period of time rather than that the charging current always remains constant. Actually, in the constant-current mode, the first charging circuit 12 can adjust the charging current of the constant-current mode in real time according to the current voltage of the multiple cells to achieve a multi-stage constant-current. Further, if the output current received by the first charging circuit 12 from the adapter is the pulsating DC, by that the first charging circuit 12 is operable in a charging mode of constant-current mode, it means that the peak value or the average value of the pulsating DC remains constant for a period of time. If the output current received by the first charging circuit 12 from the adapter is the AC, by that the first charging circuit 12 is operable in a charging mode of constant-current mode, it means that the peak value or the average value of a forward current of the AC remains constant for a period of time.

Figure 6:
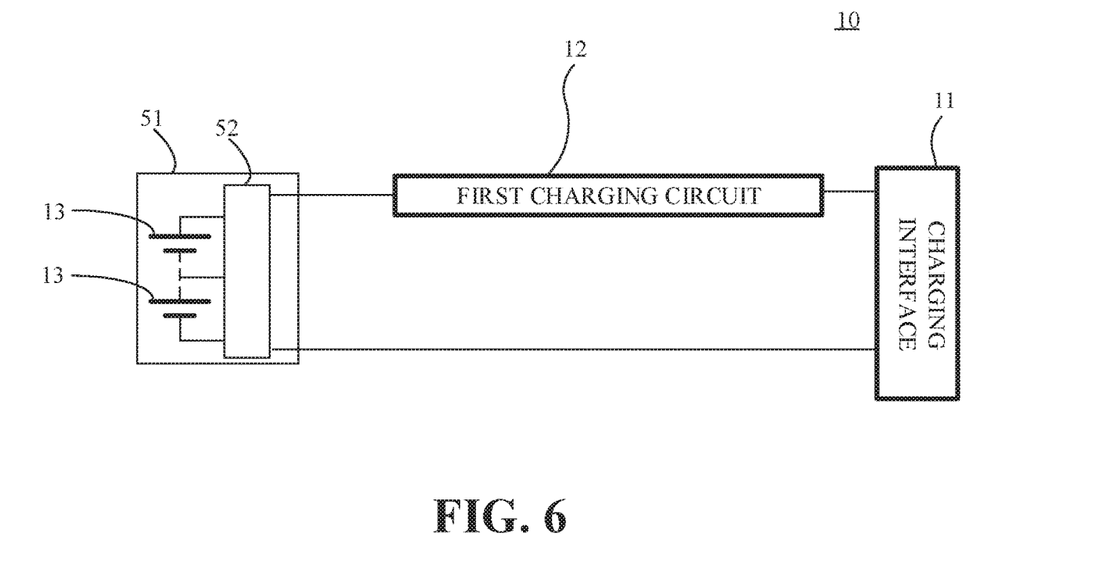
FIG. 6 is a structural diagram illustrating a terminal according to still another implementation of the present disclosure.

In some implementations, as illustrated in FIG. 6, the multiple cells 13 may be co-packaged in a battery 51. The battery 51 may further include a battery protection board 52 through which over-voltage/over-current protection, power balance management, power management, and other functions can be achieved.

Figure 7:
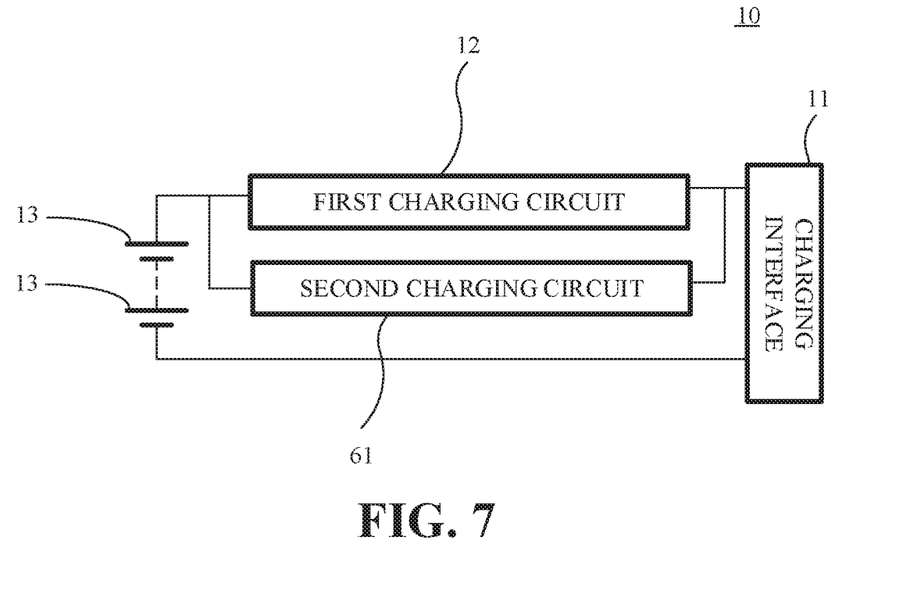
FIG. 7 is a structural diagram illustrating a terminal according to still another implementation of the present disclosure.

In one implementation, as illustrated in FIG. 7, the terminal 10 may further include a second charging circuit 61. The second charging circuit 61 can be coupled in parallel with the first charging circuit 12. The second charging circuit 61 can be coupled between the charging interface 11 and the multiple cells 13, that is, the second charging circuit 61 may have one end coupled with the charging interface and the other end coupled with one end of the multiple cells 13.

Figure 8:
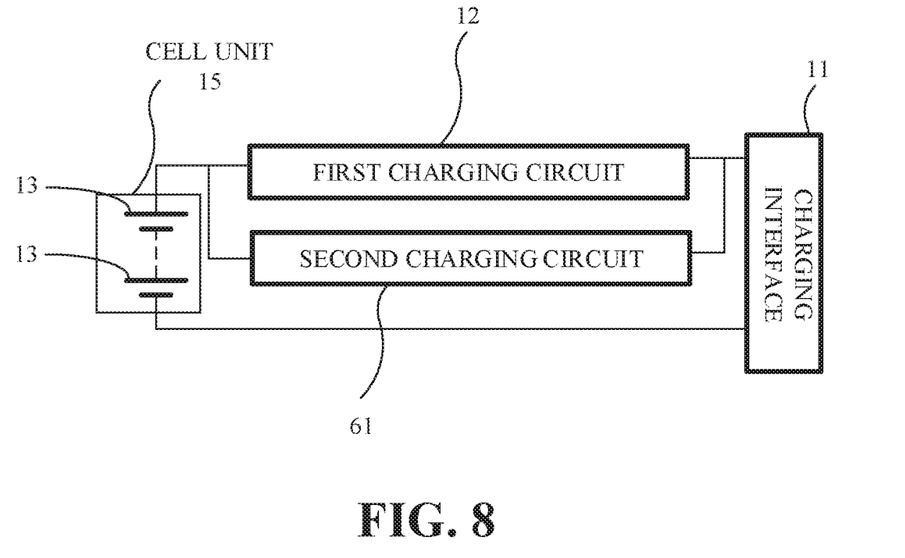
FIG. 8 is a structural diagram illustrating a device according to an implementation of the present disclosure.

As illustrated in FIG. 8, a device which has a structure similar to that of FIG. 7 is also provided. The device is equipped with a charging interface 11, a cell unit 15, a first charging circuit 12, and a second charging circuit 61. The cell unit 15 includes multiple cells connected in series. The first charging circuit 12 is coupled with the charging interface 11 and configured to receive an output voltage from a charging device (such as a power adapter) and apply the received output voltage directly to both ends of the cell unit 15 for charging the multiple cells. The second charging circuit 61 is coupled in parallel with the first charging circuit 12. The second charging circuit 61 may be configured to receive the output voltage from the charging device via the charging interface 11, step up the received output voltage, and apply the step-up output voltage to the both ends of the cell unit 15 for charging the multiple cells. The first charging circuit 12 is capable of being operated in a first charging mode, the second charging circuit 61 is capable of being operated in a second charging mode, and the charging speed of the device in the first charging mode is greater than the charging speed of the device in the second charging mode. The device can switch between the first charging circuit and the second charging circuit, that is, switch between the first charging mode and the second charging mode.

Figure 9:
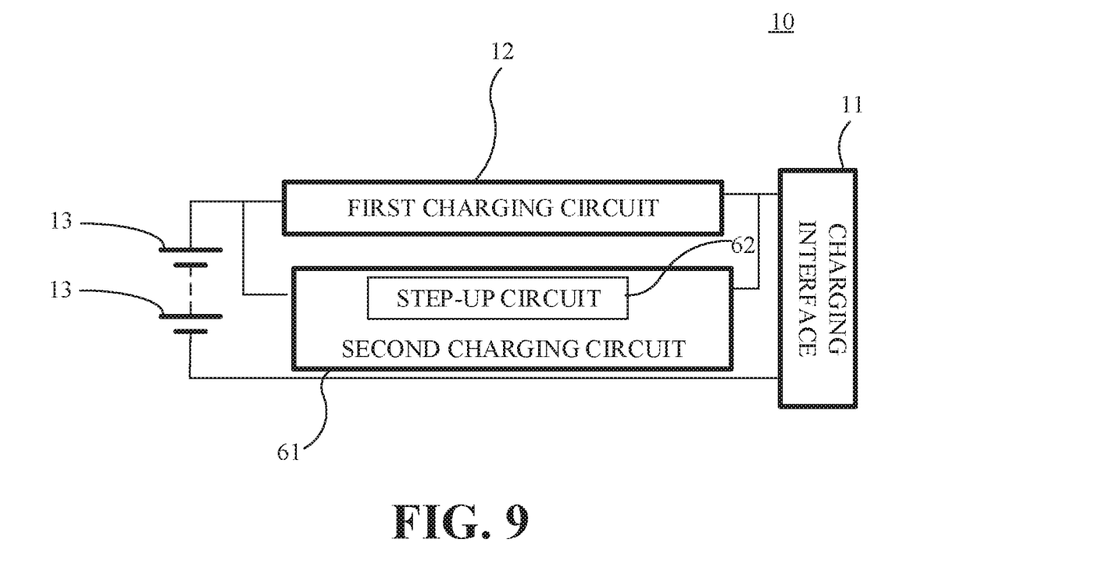
FIG. 9 is a structural diagram illustrating a terminal according to still another implementation of the present disclosure.

As illustrated in FIG. 9, the second charging circuit 61 illustrated in FIG. 7 or FIG. 8 may include a step-up circuit 62, which has one end coupled to the charging interface 11 and the other end coupled to the multiple cells 13. The step-up circuit 62 can receive the output voltage of the adapter via the charging interface 11, step-up the output voltage of the adapter to a second voltage, and apply the second voltage to both ends of the multiple cells 13 for charging. The output voltage received by the second charging circuit 61 from the adapter is less than the overall voltage of the multiple cells; the second voltage is greater than the overall voltage of the multiple cells.

From the above, the first charging circuit 12 can charge the multiple cells 13 directly; in this charging mode (that is, direct charging), requiring the output voltage of the adapter to be greater than the overall voltage of the multiple cells 13. For example, when two cells are connected in series, assuming that the current voltage of each cell is 4V, and the output voltage of the adapter is required to be at least 8V when the first charging circuit 12 is used to charge the two cells. However, the output voltage of a conventional adapter is generally 5V and therefore, it is impossible for the conventional adapter to charge the multiple cells 13 through the first charging circuit 12. To be compatible with the charging mode provided by the conventional adapter, a second charging circuit 61 including a step-up circuit is provided. The step-up circuit can increase the output voltage of the adapter to a second voltage that is greater than the overall voltage of the multiple cells 13, thereby addressing the problem that the conventional adapter cannot charge the multiple cells 13 connected in series with each other.

As long as the output voltage of the adapter is lower than the overall voltage of the multiple cells 13, it is possible to be used to charge the multiple cells 13 after being stepped up by the second charging circuit 61 and therefore, the voltage value of the output voltage received by the second charging circuit 61 from the adapter is not particularly limited.

The form of the step-up circuit is not limited, which may be but is not limited to a Booster circuit or a charge pump. In some implementations, the second charging circuit 61 may adopt a conventional charging circuit design, that is, a charging management chip can be provided between the cells and the charging interface. The charging management chip can perform constant-voltage/constant-current control in a charging process and adjust the output voltage of the adapter per actual needs, such as step-up or step-down (said differently, boost or buck). The implementation of the present disclosure can utilize the step-up function of the charging management chip to step up the output voltage of the adapter to a second voltage higher than the overall voltage of the multiple cells 13. The switching between the first charging circuit 12 and the second charging circuit 61 can be realized by a switch or a control unit. For example, the terminal can be provided with a control unit inside. The control unit can flexibly switch between the first charging circuit 12 and the second charging circuit 61 according to actual needs (such as the type of the adapter).

Quick Charging Mode and Normal Charging Mode

In one implementation, the first charging circuit 12 is operable in a charging mode which can be referred to as a first charging mode or quick charging mode and the second charging circuit 61 is operable in a charging mode which can be referred to as a second charging mode or normal charging mode. The charging speed of the terminal in the quick charging mode is greater than the charging speed of the terminal in the normal charging mode; the charging current of the terminal in the quick charging mode is greater than the charging current of the terminal in the normal charging mode for instance. The normal charging mode can be understood as a charging mode with a rated output voltage of 5V and a rated output current less than or equal to 2.5 A. The quick charging mode can be understood as a high current charging mode. The charging current of the quick charging mode can be greater than 2.5 A, up to 5-10 A for example. In the quick charging mode, a direct charging mode is adopted, that is, the output voltage of the adapter can be applied to both ends of the adapter directly.

Figure 10:
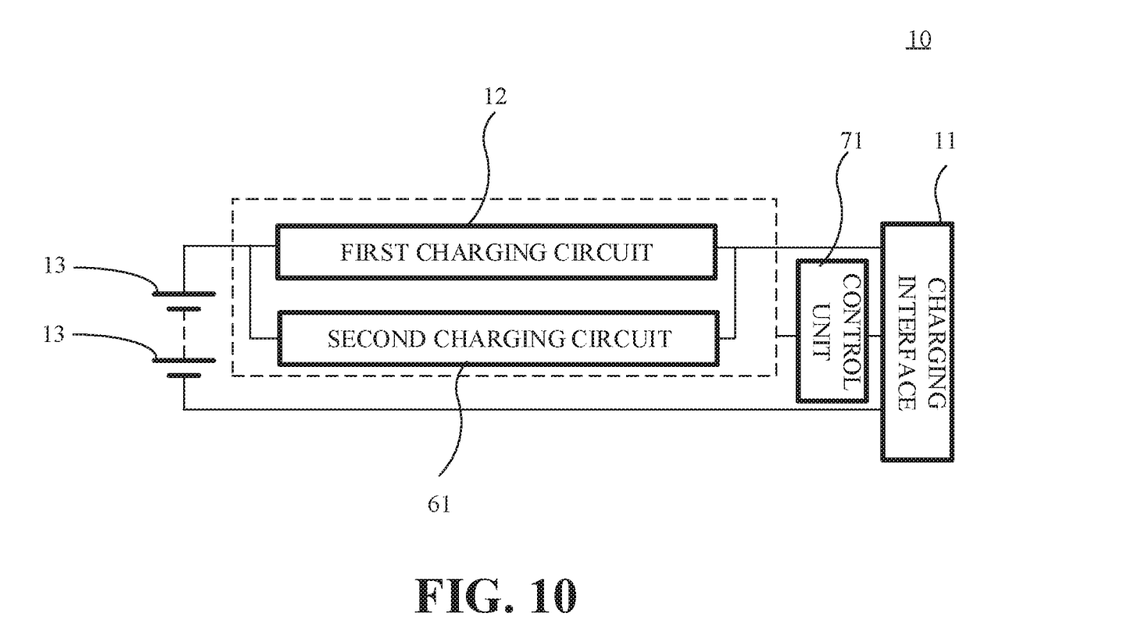
FIG. 10 is a structural diagram illustrating a terminal according to still another implementation of the present disclosure.

Furthermore, the charging interface 11 may further include a data line (not illustrated). As illustrated in FIG. 10, the terminal 10 may further include a control unit 71. The control unit 71 can perform two-way communication with the adapter through the data line to control the charging of the multiple cells 13. When a USB interface is used, the data line can be a D+ line and/or D− line in the USB interface.

With respect to contents communicated between the control unit 71 and the adapter as well as the manner in which the control unit controls the charging of the multiple cells 13, it is not specifically limited. For example, the control unit 71 can communicate with the adapter to exchange the current voltage or current power of the multiple cells 13, to control the adapter to adjust the output voltage or the output current. As another example, the control unit 71 can communicate with the adapter to interact with the instant state of the terminal, to negotiate which charging circuit of the first charging circuit 12 and the second charging circuit 61 will be used for charging.

In the following, the contents communicated between the control unit 71 and the adapter and the manner for controlling the charging process are described in detail with reference to implementations one through five.

Implementation One

The control unit 71 performs two-way communication with the adapter to determine a charging mode to be used, that is, with which the terminal will be charged. When the control unit 71 determines to charge the terminal with the quick charging mode, the control unit 71 controls the adapter to charge the multiple cells 13 through the first charging circuit 12; on the other hand, when the control unit 71 determines to charge the terminal with the normal charging mode, the control unit 71 controls the adapter to charge the multiple cells 13 through the second charging circuit 61.

In implementations of the present disclosure, the terminal is not charged indiscriminately through the first charging mode but instead will perform two-way communication with the adapter to negotiate whether the quick charging mode can be adopted so as to improve the safety of the quick charging process.

As one implementation, the process that the control unit 71 performs two-way communication with the adapter to determine the charging mode to be used can be achieved as follows. The control unit 71 may receive from the adapter a first instruction which is configured to inquire the terminal whether to enable the quick charging mode; the control unit 71 may send to the adapter a reply instruction responsive to the first instruction which is configured to indicate that the terminal agrees to enable the quick charging mode.

Implementation Two

The control unit 71 performs two-way communication with the adapter to determine a charging voltage of the quick charging mode.

The control unit 71 may receive from the adapter a second instruction, which is configured to inquire whether a current voltage output by the adapter (that is, the output voltage of the power adapter) is suitable as the charging voltage of the quick charging mode; the control unit 71 may send to the adapter a reply instruction responsive to the second instruction, which is configured to indicate that the current voltage is appropriate, high, or low. The second instruction can be configured to inquire whether the current voltage output by the adapter matches with the current voltage of the multiple cells 13, and correspondingly, the reply instruction responsive to the second instruction can be configured to indicate that the current voltage output by the adapter is matched, high, or low in relative to the current voltage of the multiple cells 13.

Implementation Three

The control unit 71 performs two-way communication with the adapter to determine a charging current of the quick charging mode.

The control unit 71 may receive from the adapter a third instruction, which is configured to inquire the maximum charging current currently supported by the terminal. The third instruction is not limited to the foregoing function, however; for example, it can also be configured to inquire a median charging current or any other current value which is helpful to determine the charging current of the quick charging mode.

The control unit 71 may send to the adapter a reply instruction responsive to the third instruction, which is configured to indicate the maximum charging current currently supported by the terminal, whereby the adapter can determine the charging current of the quick charging mode based on the maximum charging current currently supported by the terminal. The terminal can determine the maximum charging current currently supported by the terminal as the charging current of the quick charging mode, or determine the charging current of the quick charging mode after considering the maximum charging current currently supported by the terminal and its own current output capability.

Implementation Four

The control unit 71 performs two-way communication with the adapter during charging using the quick charging mode to adjust the output current of the adapter.

The control unit 71 may receive from the adapter a fourth instruction, which is configured to inquire the current voltage of the multiple cells 13. The control unit 71 may send to the adapter a reply instruction responsive to the fourth instruction, which is configured to indicate the current voltage of the multiple cells 13, whereby the adapter can adjust the charging current output by the adapter according to the current voltage of the multiple cells 13.

Implementation Five

As one implementation, the control unit 71 can perform two-way communication with the adapter, whereby the adapter can determine whether the charging interface is in a poor contact.

As one implementation, the control unit 71 may receive from the adapter a fourth instruction, which is configured to inquire the current voltage of the multiple cells 13; the control unit 71 may send to the adapter a reply instruction responsive to the fourth instruction, which is configured to indicate the current voltage of the multiple cells 13, whereby the adapter determines whether the charging interface 11 is in a poor contact according to the output voltage of the adapter and the current voltage of the multiple cells. For example, if the current voltage of the multiple cells is not equal to or far less than the output voltage of the adapter, the charging interface 11 can be deemed as in a poor contact.

Alternatively, as one implementation, the control unit 71 may further receive from the adapter a fifth instruction, which is configured to indicate that the charging interface is in a poor contact.

Figure 11:
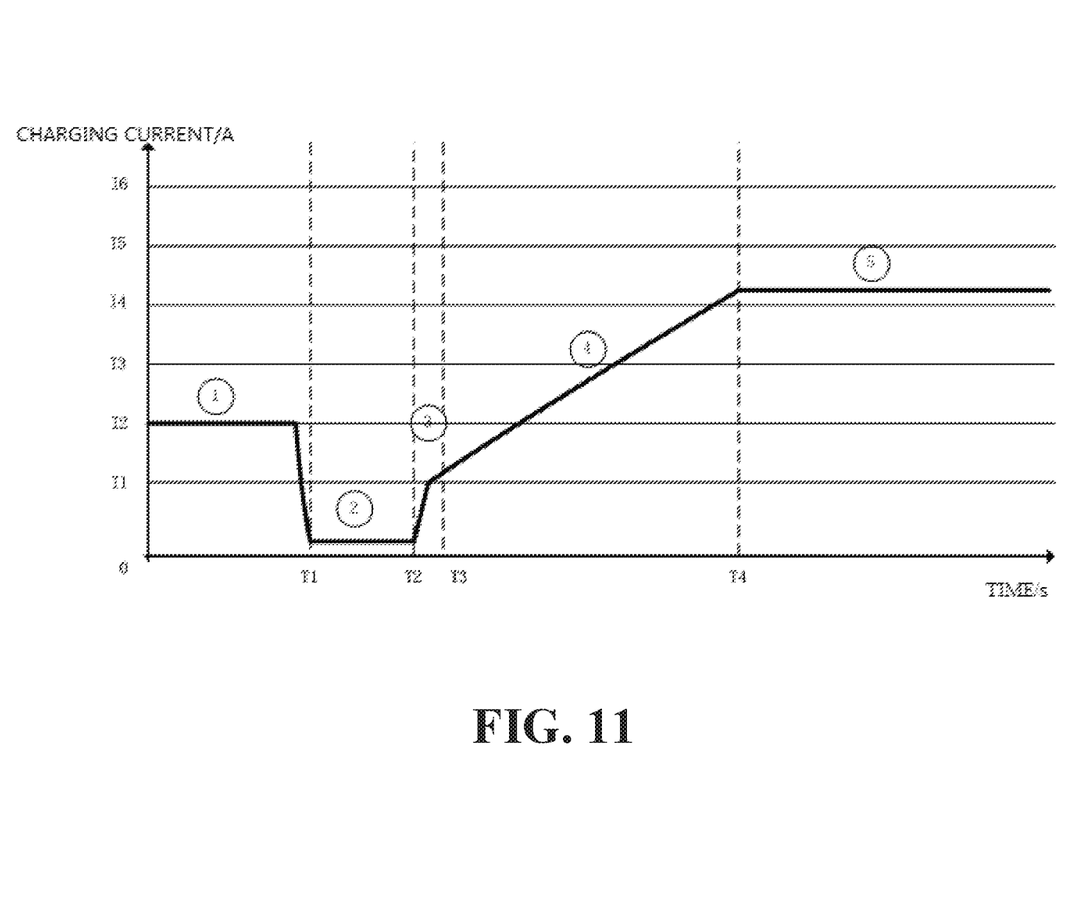
FIG. 11 is a flow chart illustrating a quick charging process according to an implementation of the present disclosure.

The communication between the terminal and the adapter will be described in more detail with reference to specific examples illustrated in FIG. 11. The examples of FIG. 11 are merely for the purpose of assisting those skilled in the art in understanding the implementations instead of limiting the implementations to the specific numerical or specific scenes. It will be apparent to those skilled in the art that various modifications or variations may be made in view of the examples illustrated in FIG. 11, and such modifications or variations are within the scope of the implementations of the present disclosure.

Quick Charging Process

As illustrated in FIG. 11, the quick charging process can include five stages, that is, Stage 1 to Stage 5.

Stage 1

After the control unit 71 is coupled to a power supply device (or a charging device), the terminal can detect the type of the power supply device through the data line D+, D−. When the power supply device is detected as an adapter, the current received by the terminal may be greater than a preset current threshold I2 (for example, may be 1 A). When the adapter detects that the output current thereof is greater than or equal to I2 for a preset duration of time (for example, a continuous period of time T1), the adapter may assume that the terminal has finished the type identification of the power supply device. Thus, the adapter may start handshaking with the control unit 71 and send Instruction 1 (corresponding to the above first instruction) to the control unit 71 to inquire whether to enable the quick charging mode (or flash charging mode).

When the adapter receives a reply instruction responsive to Instruction 1 from the control unit 71, which indicates that the control unit 71 does not agree to enable the quick charging mode, the adapter detects its own output current again. When the output current of the adapter is still greater than or equal to I2 within the preset continuous duration of time (for example, a continuous time T1), the adapter may send Instruction 1 to the control unit 71 again to inquire whether to enable the quick charging mode. The adapter repeats the above operations of stage 1 until the control unit 71 agrees to enable the quick charging mode or the output current of the adapter is no longer greater than or equal to I2.

When the control unit 71 agrees to enable the quick charging mode, the quick charging process is enabled and the quick charging communication process proceeds to Stage 2.

Stage 2

The output voltage of the adapter may correspond to multiple levels. The adapter may send Instruction 2 (corresponding to the above second instruction) to the control unit 71 to inquire whether the output voltage of the adapter is suitable as a charging voltage for the quick charging mode. In other words, Instruction 2 is configured to inquire whether the current voltage output by the adapter matches with the current voltage of the multiple cells 13.

The control unit 71 may send a reply instruction responsive to Instruction 2 to the adapter to indicate that the current voltage output by the adapter is appropriate, high, or low. For example, when the reply instruction responsive to Instruction 2 indicates that the current voltage output by the adapter is high or low, the adapter can adjust the current voltage for one level and send Instruction 2 to the control unit 71 again to inquire whether the voltage currently output by the adapter is suitable as a charging voltage for the quick charging mode. The above operations of Stage 2 will be repeated until the control unit 71 determines that the voltage currently output by the adapter is suitable as the charging voltage in the quick charging mode, and the procedure may proceed to Stage 3.

Stage 3

The adapter may send Instruction 3 (corresponding to the above third instruction) to the control unit 71 to inquire the maximum charging current currently supported by the control unit 71. The control unit 71 may send a reply instruction responsive to Instruction 3 to the adapter to indicate the maximum charging current currently supported by the terminal, and the procedure may proceed to Stage 4.

Stage 4

The adapter determines the charging current of the quick charging mode based on the maximum charging current currently supported by the terminal. The procedure may proceed to Stage 5, that is, a constant-current stage.

Stage 5

After entering the constant-current stage, the adapter may send Instruction 4 (corresponding to the above fourth instruction) to the control unit 71 at intervals to inquire the current voltage of the multiple cells 13. The control unit 71 can send to the adapter a response message to Instruction 4, to feedback the current voltage of the multiple cells 13. Based on the current voltage of the multiple cells 13, the adapter can judge whether the charging interface is in a good contact and whether it is necessary to step-down the output current thereof. When the adapter judges that the charging interface is in a poor contact, it can send Instruction 5 (corresponding to the above fifth instruction) to the control unit 71 and then reset to re-enter Stage 1.

As one implementation, at Stage 1, when the control unit 71 sends the reply instruction responsive to Instruction 1, data or information of path impedance of the terminal can be carried in the reply instruction responsive to Instruction 1. With aid of the data of path impedance of the terminal, the adapter can determine whether the charging interface is in a good contact at Stage 5.

As another implementation, at Stage 2, the time elapsed from when the terminal agrees to enable the quick charging mode until when the adapter adjusts the output voltage to an appropriate voltage can be controlled to be within a certain range. When the time exceeds the certain range, the control unit 71 may determine that the quick charging communication process is abnormal and reset to re-enter Stage 1.

As still another implementation, at Stage 2, when the current voltage output by the adapter is $\Delta V$ (which is about 200~500 Mv) higher compared with current voltage of the multiple cells 13, the control unit 71 can send the reply instruction to Instruction 2 to the adapter to indicate that the current voltage output by the adapter is appropriate.

As still another implementation, at Stage 4, the adjustment speed of the output current of the adapter can be controlled within a certain range; as such, abnormality induced by excessive adjustment speed in the charging process of the first charging circuit 12 can be avoided.

As still another implementation, at Stage 5, the variation of the output current of the adapter can be controlled within 5%.

As still another implementation, at Stage 5, the adapter can monitor the path impedance of the first charging circuit 12 in real time. Specifically, the adapter may monitor the path impedance of the first charging circuit 12 based on the output voltage of the adapter, the output current, and the current voltage of the multiple cells 13 fed back by the control unit 71. When the path impedance of the first charging circuit 12 is greater than the sum of the path impedance of the terminal and the impedance of the charging cable, the adapter may consider that the charging interface is in a poor contact and stop charging with the first charging circuit 12.

As still another implementation, after the quick charging mode is enabled, intervals at which the adapter and the control unit 71 are communicated can be controlled to be within a certain range to avoid abnormalities caused by short intervals in the quick charging communication process.

As still another implementation, termination of the quick charging process (or termination of the quick charging mode) may be a recoverable and unrecoverable termination.

For example, when it is detected that the multiple cells 13 are fully charged or the charging interface is in a poor contact, the quick charging process can be stopped and reset to re-enter Stage 1; otherwise if the terminal does not agree to enable the quick charging mode, the quick charging communication process would not enter Stage 2. Herein, this kind of termination of the quick charging process can be referred to as "unrecoverable termination".

As another example, when the communication between the control unit 71 and the adapter is abnormal, the quick charging process is stopped and reset to re-enter Stage 1. When the requirement of Stage 1 is met, the control unit 71 agrees to enable the quick charging mode to restore the quick charging process. Here, this kind of quick charging process can be referred to as "recoverable termination".

As another example, when the control unit 71 detects that a certain cell in the multiple cells 13 is abnormal, the quick charging process can be stopped and reset to re-enter Stage 1. After entering Stage 1, the control unit 71 does not agree to enable the quick charging mode. Until each of the multiple cells 13 returns to normal and meet the requirement of Stage 1, the control unit 71 agrees to enable the quick charging mode to restore the quick charging process. Here, this kind of termination of the quick charging process is a "recoverable termination".

The communication actions or operations illustrated in FIG. 11 are merely examples. For example, at Stage 1, after the terminal and the adapter are connected, the handshake communication therebetween may also be initiated by the control unit 71; that is, the control unit 71 can send Instruction 1 to inquire the adapter whether to enable the quick charging mode. When the control unit 71 receives from the adapter a reply instruction indicating that the adapter agrees to enable the quick charging mode, it can charge the multiple cells 13 through the first charging circuit 12.

In addition to the operations illustrated in FIG. 11, after Stage 5, a constant-voltage charging stage can be further included. That is, at Stage 5, the control unit 71 may feed back the current voltage of the multiple cells 13 to the adapter. When the current voltage of the multiple cells 13 reaches a constant-voltage charging voltage threshold, the charging stage may turn to the constant-voltage stage from the constant-current stage. In the constant-voltage stage, the charging current gradually decreases and charging will be terminated when the charging current drops to a certain threshold, and this indicates that the multiple cells 13 have been fully charged.

Components illustrated in the figures can be combined or substituted without conflict. For instance, the control unit 71 illustrated in FIG. 10 can be combined with the circuit structures illustrated in any of FIG. 1 through FIG. 9.

Those of ordinary skill in the art will appreciate that, the units and steps of each of the examples described in connection with the implementations disclosed herein can be implemented in the form of electronic hardware or in a combination of computer software and electronic hardware. Whether these functions are implemented in hardware or software depends on specific applications and design constraints of the technical solution. The skilled artisan may use different methods to implement the described functions for each particular application, but such implementations should not be considered as beyond the scope of the present disclosure.

It will be apparent to those skilled in the art that, for the convenience and simplicity of description, the specific processes of the described systems, devices, and units described above may refer to the corresponding processes in the foregoing implementations of the method and will not be described again.

In the implementations of the present disclosure, it will be appreciated that, the system, device, and method disclosed can be implemented in other ways. For example, the device implementations described above are merely illustrative; the division of the units is only a logical function division, and the units can be divided into other ways during the actual implementation; for example, multiple units or components can be combined or can be integrated into another system, or some features can be ignored or not implemented. In addition, the coupling or direct coupling or communication connection illustrated or discussed between each other can be an indirect coupling or indirect communication connection via some interface, device, or unit, and it can be in electrical, mechanical, or other forms.

The units illustrated as separate components can or cannot be physically separated, and the components displayed as units can or cannot be physical units, that is to say, the units or components can be located in one place, or can be distributed over multiple network elements. Some or all of these units can be selected according to actual needs to achieve the purpose of the implementations of the present disclosure.

In addition, the functional units in various implementations of the present disclosure can be integrated into one processing unit. It is also possible that the individual units are physically present individually, or, it is also possible to integrate two or more units into one unit.

When implemented in the form of a software functional unit and sold or used as a stand-alone product, the functionality can be stored in a computer readable storage medium. Based on such understanding, technical solutions of the present disclosure in essence or in part, or part of the technical solutions which contribute to the related art, can be embodied in the form of a software product. The software product can be stored in a storage medium and include several instructions, which is configured to cause computer equipment (such as a personal computer, a server, or network equipment) to execute all or part of the method steps of the implementations of the present disclosure. The aforementioned storage medium includes U-disk, mobile hard disk, Read-Only Memory (ROM), Random Access Memory (RAM), disk, CD, or various media that can store program code.

What is claimed is:

1. A terminal, comprising:
    a charging interface;
    a first charging circuit, coupled with the charging interface, and configured to receive an output voltage from an adapter and apply the output voltage directly to both ends of multiple cells connected in series in the terminal to charge the multiple cells without voltage converting;
    a second charging circuit comprising a step-up circuit, the step-up circuit having a first end coupled with the charging interface and a second end coupled with the multiple cells,
        wherein the step-up circuit is configured to receive the output voltage of the adapter via the charging interface, step up the output voltage of the adapter to a second voltage, and apply the second voltage to both ends of the multiple cells for charging;
        wherein the output voltage of the adapter is received by the second charging circuit being less than an overall voltage of the multiple cells, the second voltage being greater than the overall voltage of the multiple cells; and wherein the first charging circuit is operable in a quick charging mode, the second charging circuit is operable in a normal charging mode, and a charging speed of the terminal in the quick, charging mode is higher than the charging speed of the terminal in the normal charging mode;

an equalization circuit coupled with the multiple cells, the equalization circuit is configured to equalize voltages among each cell of the multiple cells, wherein the multiple cells comprises a main cell and at least one secondary cell, the equalization circuit comprises at least one load each connected at both ends of each of at least one secondary cell to consume the power of the secondary cell, such that the power of the secondary cell is consistent with the main cell; and a control unit configured to:
perform two-way communication with the adapter to determine a charging mode; and
switch between the first charging circuit to charge the multiple cells through the first charging circuit upon determining that the terminal will be charged with the quick charging mode and the second charging circuit to charge the multiple cells through the second charging circuit upon determining that terminal will be charged with the normal charging mode.

2. The terminal of claim 1, further comprising:
a step-down circuit, having input ends and an output end, the input ends being coupled with both ends of the multiple cells and configured to convert an overall voltage of the multiple cells into a first voltage V1, wherein a≤V1≤b, a represents the minimum operating voltage of the terminal, and b represents the maximum operating voltage of the terminal; and
a power supply circuit, coupled to the output end of the step-down circuit and configured to supply power to system components of the terminal based on the first voltage.

3. The terminal of claim 2, wherein the step-down circuit comprises a charge pump, and the first voltage is 1/N of the overall voltage of the multiple cells, and wherein N represents the number of cells included in the multiple cells.

4. The terminal of claim 1, wherein the first charging circuit is further configured to receive an output current from the adapter, and wherein the output current is one of a pulsating direct current and an alternating current.

5. The terminal of claim 1, wherein the first charging circuit is operable in a charging mode of constant-current mode.

6. The terminal of claim 1, wherein the output voltage of the adapter received by the second charging circuit is 5V.

7. The terminal of claim 1, wherein the charging interface comprises a data line, and the control unit is configured to perform two-way communication with the adapter via the data line.

8. The terminal of claim 7, wherein the control unit configured to perform the two-way communication is further configured to:
perform the two-way communication with the adapter to determine a charging voltage of the quick charging mode.

9. The terminal of claim 8, wherein the control unit configured to perform the two-way communication to determine the charging voltage of the quick charging mode is further configured to:
receive a second instruction from the adapter, the second instruction being configured to inquire whether the output voltage of the adapter is suitable as the charging voltage of the quick charging mode; and
send a reply instruction responsive to the second instruction to the adapter, the reply instruction responsive to the second instruction being configured to indicate that the output voltage is one of appropriate, high, and low.

10. The terminal of claim 7, wherein the control unit configured to perform the two-way communication is further configured to:
perform the two-way communication with the adapter to determine a charging current of the quick charging mode.

11. The terminal of claim 10, wherein the control unit configured to perform the two-way communication with the adapter to determine the charging current of the quick charging mode is further configured to:
receive a third instruction from the adapter, the third instruction being configured to inquire the maximum charging current currently supported by the terminal; and
send a reply instruction responsive to the third instruction to the adapter, the reply instruction responsive to the third instruction being configured to indicate the maximum charging current currently supported by the terminal, wherein the adapter determines the charging current of the quick charging mode according to the maximum charging current currently supported by the terminal.

12. The terminal of claim 7, wherein the control unit configured to perform the two-way communication with the adapter via the data line to control the charging of the multiple cells is further configured to:
perform the two-way communication with the adapter during charging with the quick charging mode to adjust an output current of the adapter.

13. The terminal of claim 12, wherein the control unit configured to perform the two-way communication with the adapter to adjust the output current of the adapter is further configured to:
receive a fourth instruction from the adapter, the fourth instruction being configured to inquire a current voltage of the multiple cells; and
send a reply instruction responsive to the fourth instruction to the adapter, the reply instruction responsive to the fourth instruction being configured to indicate the current voltage of the multiple cells, wherein the adapter adjusts the output current of the adapter according to the current voltage of the multiple cells.

14. The terminal of claim 1, wherein the control unit configured to perform the two-way communication with the adapter is further configured to:
receive a first instruction from the adapter, the first instruction being configured to inquire the terminal whether to enable the first charging mode; and
send a reply instruction responsive to the first instruction to the adapter, the reply instruction responsive to the first instruction being configured to indicate that the terminal determines to enable the quick charging mode.

15. The terminal of claim 1, further comprising:
a power supply circuit, having input ends coupled with both ends of a single cell of the multiple cells and supply power to devices inside the terminal based on a voltage of the single cell coupled with the power supply circuit.

16. A device, comprising:
a charging interface;
a cell unit comprising multiple cells connected in series;

a first charging circuit, coupled with the charging interface and configured to receive an output voltage from a charging device and apply the output voltage directly to both ends of the cell unit for charging the multiple cells;

a second charging circuit, coupled in parallel with the first charging circuit and configured to receive the output voltage from the charging device via the charging interface, step up the received output voltage, and apply a step-up output voltage to the both ends of the cell unit for charging the multiple cells, wherein the first charging circuit is capable of being operated in a quick charging mode, the second charging circuit is capable of being operated in a normal charging mode, and a charging speed of the device in the quick charging mode is greater than the charging speed of the device in the normal charging mode;

an equalization circuit, coupled with the multiple cells and configured to equalize voltages among each cell of the multiple cells, wherein the multiple cells comprises a main cell and at least one secondary cell, the equalization circuit comprises at least one load each connected at both ends of each of at least one secondary cell to consume the power of the secondary cell, such that the power of the secondary cell is consistent with the main cell; and a control unit, configured to perform two-way communication with the adapter to determine a charging mode, and switch between the first charging circuit to charge the multiple cells through the first charging circuit upon determining that the terminal will be charged with the quick charging mode and the second charging circuit to charge the multiple cells through the second charging circuit upon determining that terminal will be charged with the normal charging mode.

\* \* \* \* \*